United States Patent [19]

Wells

[11] Patent Number: 4,766,435

[45] Date of Patent: Aug. 23, 1988

[54] ADAPTIVE RADAR FOR REDUCING BACKGROUND CLUTTER

[75] Inventor: Donald R. Wells, Villa Park, Calif.

[73] Assignee: Hughes Aircraft Company, Los Angeles, Calif.

[21] Appl. No.: 867,866

[22] Filed: May 27, 1986

[51] Int. Cl.[4] ............................................. G01S 7/42
[52] U.S. Cl. .................................... 342/82; 342/188; 342/159
[58] Field of Search ................ 342/82, 188, 361, 365, 342/366, 159

[56] References Cited

U.S. PATENT DOCUMENTS

| | | | |
|---|---|---|---|
| 3,025,513 | 3/1962 | Easy et al. | 342/188 |
| 3,540,045 | 11/1970 | Taylor | 342/82 |
| 4,041,489 | 9/1977 | Lewis | 343/17.1 R |
| 4,053,882 | 10/1977 | Van Etten | 343/5 |
| 4,231,037 | 10/1980 | Long | 343/5 |
| 4,323,899 | 4/1982 | Barnes et al. | 343/55 |
| 4,329,687 | 5/1982 | Kloevekorn et al. | 343/13 |
| 4,472,717 | 9/1984 | Eaves et al. | 343/5 |

OTHER PUBLICATIONS

Virtual Polarisation Adaptation by A. J. Poelman, Oct. 1981, IEE Proceedings, vol. 128, No. 5, pp. 261–270.
A Study of Controllable Polarization Applied to Radar, by A. J. Poelman, pp. 389–404.
Polarisation-Vector Translation in Radar Systems, A Technique Within Virtual Polarization Adaptation, by A. J. Poelman, 1983, Paper No. STC PP-203.
Target Detection Enhancement-2 Add On, by D. R. Wells, Jul. 1984, Publication No. HAC-0017-84.
RCS Matrix Studies of Sea Clutter, by L. A. Morgan et al., Teledyne Micronetics Report No. R5-81, Mar. 1981.

Primary Examiner—T. H. Tubbesing
Assistant Examiner—Gilberto Barrón, Jr.
Attorney, Agent, or Firm—A. W. Karambelas

[57] ABSTRACT

An adaptive radar apparatus is provided for substantially reducing background clutter, particularly relatively time-invariant clutter, such as sea clutter, and especially at low radar grazing angles. The apparatus includes a transmitting antenna having horizontally and vertically oriented, transmitting elements and a relative phase control therebetween and a receiving antenna also with horizontally and vertically oriented receiving elements also having relative phase detection and phase shift possible therebetween. A controllable radar signal generator is provided for supplying signals to the transmitting antenna and a controllable signal processor is provided for processing return signals from the receiving antenna. Means are included for determining, from return test signals, a background mean null polarization for a number of radar range and azimuth cells and for providing null polarization control signals $H_o$, $V_o$ and $\phi_o$, to the signal generator and return signal processor to cause the radar to operate at a polarization state which is the same as the clutter mean null polarization. A corresponding method is provided for reducing background clutter, especially relatively time-invariant sea clutter, a low grazing angle radar.

1 Claim, 3 Drawing Sheets

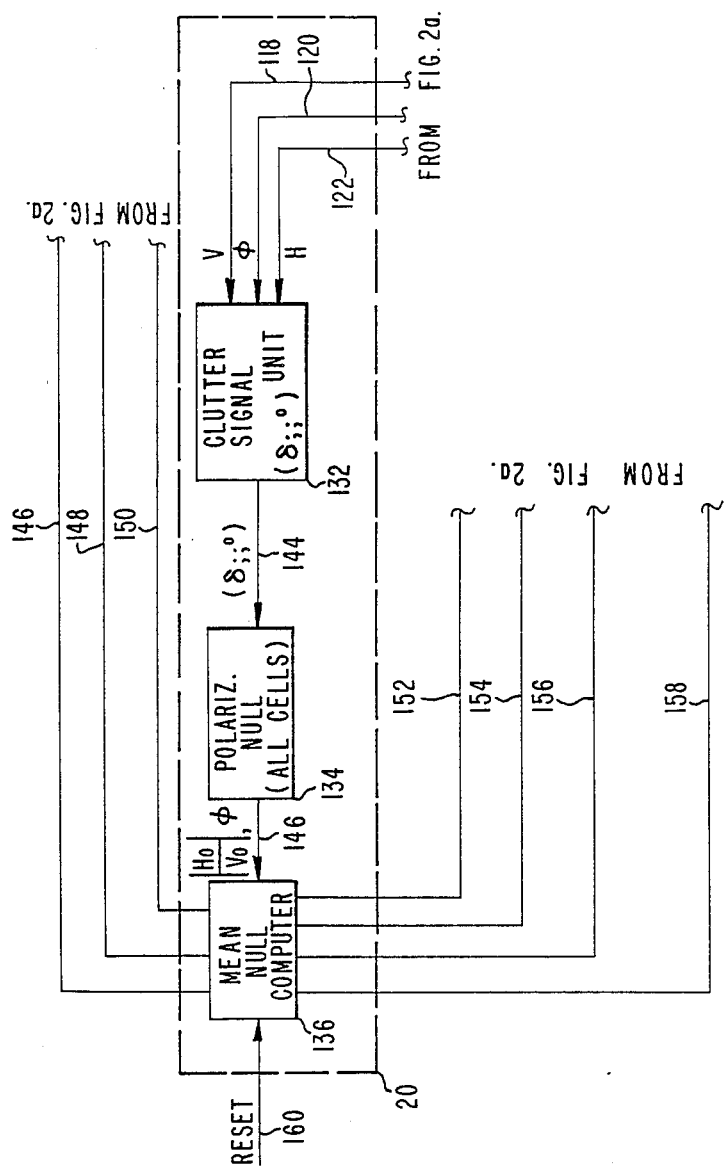

ADAPTIVE RADAR FOR REDUCING BACKGROUND CLUTTER

The Government has rights in this invention pursuant to Contract (or Grant) No. 1459 awarded by the Department of Defense.

BACKGROUND OF THE INVENTION

1. Field of the Invention

The present invention relates generally to the field of radar and, more particularly, to radar apparatus having provision for substantially reducing background clutter, especially sea clutter, at low radar grazing angles.

2. Description of Related Art

Radar reflections (echos) from irregular background surfaces, especially at low radar grazing angles, are known to interfere, often drastically, with the detection of low target objects such as ships and low flying aircraft and missiles. Because of the importance of being able to quickly detect targets at substantial ranges, much effort has understandably been directed towards target enhancement and/or background clutter suppression.

Both range gating and Doppler filtering or Doppler frequency discrimination are known techniques for reducing the relative effects of background clutter in radar systems. With particular respect to Doppler filtering, it is well known that frequency shifts, known as Doppler frequency shifts, are obtained from radar returns from moving objects. Since radar returns from objects that are stationary, or are stationary with respect to the radar transmitter and receiver, do not exhibit Doppler shifts, the possibility exists, through Doppler frequency filtering, to discriminate moving objects from stationary objects and, hence, moving targets from stationary background.

Ground and sea clutter are, however, very widely dispersed and range and Doppler ambiguities greatly compound the problem of discriminating targets from their background. Range ambiguities, in effect, break the range profile of radar target and background echos into zones which are superimposed upon one another. As a consequence, the radar echo from a target may be received simultaneously with clutter not only from the target's own particular range but also from the corresponding range in every other range zone. An unambiguous range zone, in nautical miles, is approximately equal to 80 divided by the radar pulse repetition frequency (PRF) expressed in kHz; therefore, increasing the radar PRF narrows the zone ranges and increases the number of superimposed zones, making it increasingly difficult to isolate the target echo from the background clutter.

On the other hand, Doppler ambiguities cause successive repetitions of the target and background Doppler profile to overlap, resulting in a target echo having to compete with background clutter whose true Doppler frequency is quite different from that of the target. In contrast to range ambiguities, increasing the radar PFF has the effect of moving the successive repetitions of the main lobe clutter further apart on the frequency axis, thereby making isolation of the target echo easier.

Thus, at low radar PRF's, Doppler ambiguities dominate, whereas at high radar PRF's, range ambiguities dominate. The selection of radar PRF so as to reduce the effects of background clutter can, therefore, be seen not to be entirely effective.

The polarization state of transmitted and reflected radar signals is also known to have an effect on the ability to discriminate targets from background clutter. In brief, radar signal polarization can be understood by considering the radar signals, both transmitted and reflected to comprise electromagnetic waves having a transverse oscillatory motion defined by the orientation of the associated electric field vector. In the general polarization case, the terminus of the electric field vector traces out an elliptical path in space, the sense of the polarization being either right- or left-handed according to the rotational direction of the electric field vector as viewed along the direction of wave propagation. This general case is known as elliptical polarization. Linear and circular polarization are seen to be special cases of elliptical polarization.

Elliptically polarized transmitted signals are provided by shifting the phase between the horizontal and vertical components of the signal. Ordinarily, the receiving antenna is geometrically similar to the transmitting antenna and, in fact, the same antenna is usually used, on a time sharing basis, as both a transmitting and a receiving antenna. Radar return signals are commonly processed so that it appears that the transmitted and reflected signals have the same polarization state. In such regard, it is, however, generally known that the maximum amount of energy can be extracted from a reflected signal when the polarization state of the return signal is the same as the "polarization" of the receiving antenna. Conversely, when the polarization state of the reflected radar signal is opposite to the "polarization" of the receiving antenna, a minimum amount of energy is extracted from the return signal. Advantage of such effect is taken, for example, by using circularly polarized radar signals or receiver antenna processes to reduce the radar return clutter from rain. It should further be observed that depending upon characteristics of the target, the polarization state of the reflected signal may not be the same as that of the transmitted signal; that is, a target may "depolarize" the signal.

When investigating the possibility of using specific transmitting and signal processing polarization states to assist in target discrimination, either by enhancing the target return signal or suppressing background clutter, it may be advantageous to construct a visual representation of the polarization states involved. One such visualization that may help in the understanding of polarization processing is the polarization sphere of Poincaré.

An elliptically polarized wave can be constructed of two orthogonal electric field vectors which represent minor and major axes of the ellipse and which have a ratio, r, of minor to major axes. Moreover, the major axis will be spatially oriented at an angle, $\phi$, relative to the local horizontal. The polarization of this signal is represented by a single point on the surface of the Poincaré sphere. On such a sphere, the point representing the polarization state has a longitude coordinate of $2\phi$ and a latitude coordinate of $2\gamma$ (wherein $\gamma$ is the ellipticity angle and is defined as $2\gamma = 2$ arctan (r), the two angles $\phi$ and $\gamma$ completely specifying the state of polarization. The result is that there is a one-to-one correspondence such that each point on the Poincaré sphere represents a specific polarization state and different points on the sphere represent different polarization states.

A discussion of Poincaré sphere representation of polarization states can, for example, be found in an article entitled "Virtual Polarization Adaptation" by A.

J. Poelman which appeared in *IEE Proceedings*, Vol. 128, No. 5, pages 261–270, October 1981.

It can be readily determined that all linear polarization states lie on the equator of a Poincaré sphere and that circular polarization points lie at the poles of the sphere, depending on whether the circular polarization is right- or left-handed. Points representing all right-hand sense polarizations, including right-hand sense circular polarization, have both $\phi$ and $\gamma$ positive and, therefore, lie on the upper hemisphere of a Poincaré sphere. Points representing left-hand sense polarizations (both $\phi$ and $\gamma$ negative) lie on the lower hemisphere of the Poincaré sphere.

At any particular instant in time, there exists for every radar-visible object, including both targets and such background as ground and sea surfaces, a particular radar signal polarization state which produces a maximum signal return. This particular maximum polarization state can, of course, be represented by a point somewhere on the Poincaré sphere. Over a period of time, if the object, for example, changes orientation relative to the radar, the maximum polarization state will typically change, giving rise to a series of maximum points for that particular object on the sphere. Depending on the nature of the object and its movement relative to the radar, these maximum points on the sphere may be quite widely scattered.

There is also some evidence suggesting that widely different objects, such as ships, aircraft and missiles, have widely different patterns of maximum polarization points on the Poincaré sphere. It does not, therefore, appear feasible to operate a surveillance radar at a particular maximum polarization state which will enhance the discrimination of all or even most potential targets from background clutter. Even in the unlikely event this were possible for known targets, the possibility exists that previously unencountered targets would not exhibit a similar maximum polarization state enabling them to be discriminated from background clutter.

However, any object, at any point in time, will also have a null polarization state; that is, a polarization of transmitter and receiver producing zero signal return. In fact, any fixed reflecting target has two such null polarization states which are represented by a pair of points on the Poincaré sphere. These two points representing null polarizations are understood to be on the same great circle of the sphere on which the two cross polarization nulls lie (wherein the transmitter and receiver are cross polarized).

It has been suggested by Poelman in his above-mentioned article that null polarization techniques may possibly provide an approach to enhancing target detection in the presence of background clutter. Poelman has not, however, to the present inventor's knowledge, publicized radar data that illustrates the clutter rejection methods by considering average positions on the polarization (Poincaré) sphere.

Improved radar apparatus, and related improved operating processes, are therefore still presently needed to enhance the ability of radars, particularly those operated over water at low grazing angles such as is common for shipboard radars, to discriminate targets accurately and reliability from background clutter.

SUMMARY OF THE INVENTION

Adaptive radar, according to the present invention, for substantially reducing relatively time-invariant background clutter, such as sea clutter, especially at low radar grazing angles, comprises radar signal transmitting means having orthogonal first and second radiating antenna elements and radar signal receiving means having orthogonal first and second receiving antenna elements. Included are controllable radar signal generating means for providing radar signals to the signal transmitting means at selected polarization states and controllable radar return signal processing means for processing return signals received by the signal receiving means in accordance with the selected polarization states. Null polarization computing and control means are included in the radar apparatus for determining, from signal returns received by the radar, a null polarization associated with background clutter and for causing the radar signal generating means and the radar return signal processing means to operate at a null polarization state corresponding to the background null polarization.

The first and second radiating antenna elements may be generally rectangular apertures, which are associated with corresponding first and second rectangular radiating waveguides, and are respectively horizontally and vertically oriented. Similarly, the first and second receiving antenna elements may be generally rectangular apertures which are associated with corresponding first and second rectangular receiving waveguides.

In an embodiment of the invention, the null polarization computing and control means are operative for causing a predetermined test signal to be provided by the radar signal generating means to the signal transmitting means and for determining from the return of the test signal the background null polarization.

It is preferred that the null polarization computing and control means also be operative for determining the background null polarizations for a predetermined number of ranges and azimuth cells and for determining therefrom a mean null polarization associated with the background clutter.

Also according to an embodiment of the invention, the null polarization computing and control means are operative for computing a pair of first and second polarization nulls polarization of the background clutter and, in such case, for causing the radar signal generating means and the return signal processing means to operate at either first or second null polarization states corresponding respectively to the first and second polarization nulls.

A corresponding method is provided for substantially reducing, in radar and especially in low grazing angle radar, signal return clutter from relatively time-invarient background. The method comprises the steps of radiating, from a transmitting antenna, towards a relatively time-invarient backaground, a radar test signal; receiving from a receiving antenna return test signals from such background and determining from the return signals a null polarization of the background clutter. The method further comprises transmitting radar signals from the transmitting antenna at a polarization state equal to the background null polarization and processing radar return signals received from the receiving antenna at the null polarization of the background clutter.

The method includes transmitting the test and radar signals from separate, horizontally and vertically oriented transmitting elements and receiving the test and radar return signals through separate horizontally and vertically oriented receiving elements. The transmitting and receiving elements may be waveguides or dipoles or arrays thereof. Also, the transmitting and receiving elements may be common.

Preferably, the method includes determining a number of clutter null polarizations associated with a like number of radar range and azimuth cells, and then determining therefrom a clutter mean polarization null for all the cells involved.

A pair of mean polarization nulls of the clutter may be determined, the method then including operating the radar alternately between two polarization states corresponding to the two clutter mean polarization nulls.

By operating the radar apparatus at the background clutter null polarization state, or at the mean null polarization state of the clutter, the radar return clutter associated with the background is eliminated, or at least substantially reduced, and target detection is thereby made easier. When the radar apparatus is caused to operate alternately between two mean null poplarizations associated with the two background clutter null polarizations, the possibility of missing a target having a null polarization at one of the background null polarizations is substantially reduced.

BRIEF DESCRIPTIONS OF THE DRAWINGS

A better understanding of the present invention may be had from a consideration of the drawings in which:

FIG. 1 is a functional block diagram of a null polarization operating radar in accordance with the present invention, showing principal portions of the radar; and FIG. 2 is a functional block diagram showing a more detailed breakdown of the radar depicted in FIG. 1.

In the figures, like features and elements are given like reference numbers.

DESCRIPTION OF THE PREFERRED EMBODIMENT

Figure 1:
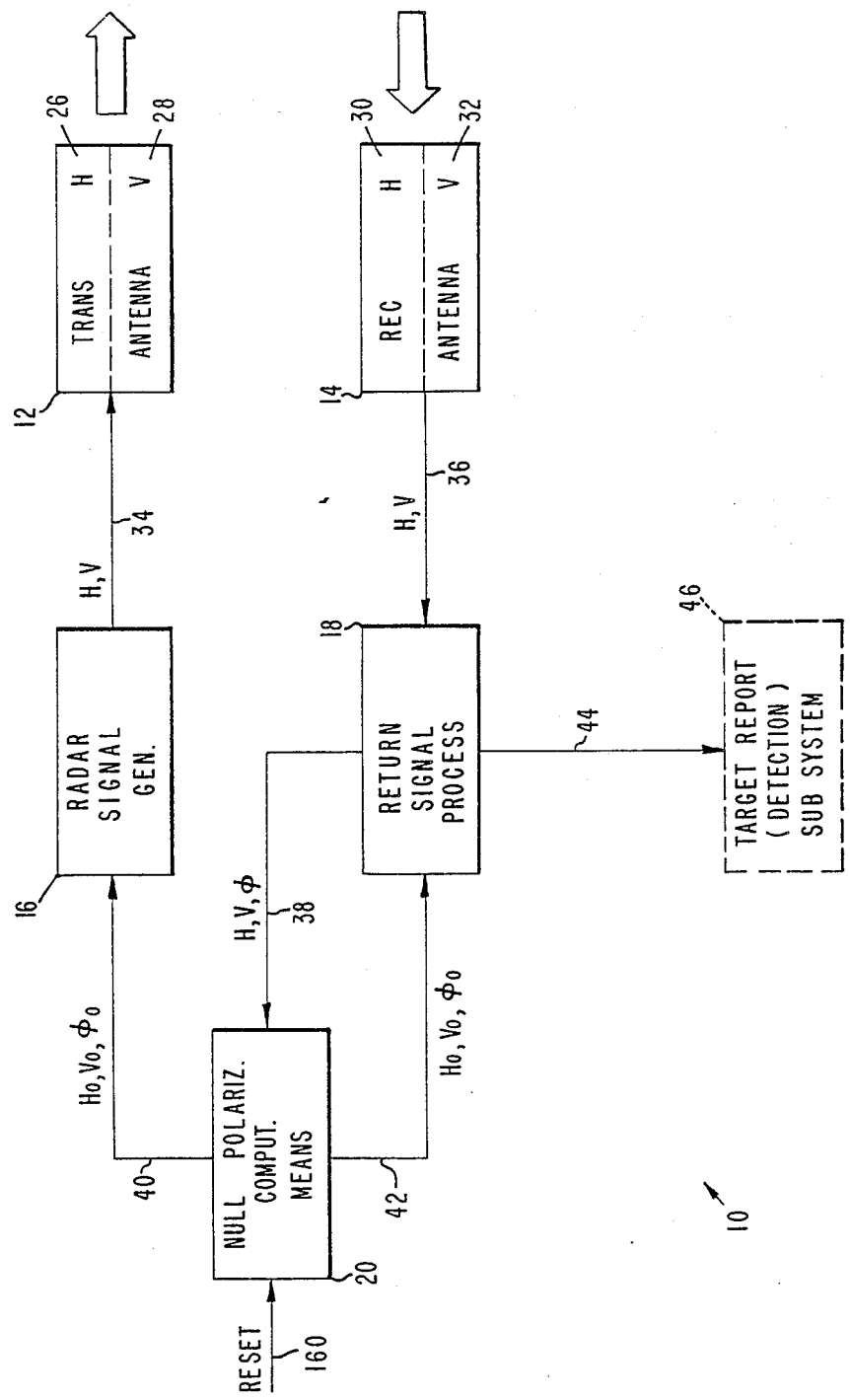

A null polarization, adaptive radar 10, according to the present invention, is shown in block diagram form in FIG. 1. Generally comprising radar 10, as more particularly described below, are transmitting antenna means 12, receiving antenna means 14, radar signal generating means 16, return signal processing means 18 and null polarization, background clutter computing and control means 20.

Transmitting means 12 comprise first and second radar antenna portions 26 and 28, for example, conventional rectangular radar waveguide or dipole antenna, either individually or in an array, for respectively emitting horizontally and vertically polarized radar waves in a conventional manner. Similarly, receiving means 14 comprise first and second, respective horizontal and vertical, radar return signal receiving antenna portions 30 and 32, which may also be of conventional configuration and which may comprise rectangular waveguides, dipoles or arrays thereof.

Radar transmitting means 12 are connected, by an electrical conduit or microwave guide conduit means 34, to radar signal generating means 16 for receiving therefrom "H" and "V" signals to be transmitted, respectively, by horizontal and vertical transmitter portions 26 and 28, as horizontally and vertically polarized signals or waves. In a similar manner, radar receiving means 14 are connected, by an electrical conduit or microwave guide means 36, to radar return signal processing means 18, and provides thereto "H" and "V" return signals from respective horizontal and vertical antenna portions 30 and 32.

As more particularly described below, computer and control means 20 are connected, by an electrical conduit 38, for receiving "H", "V" and "$\phi$" data from return signal processing means 18 and for providing, over respective electrical conduits 40 and 42, "$H_o$", "$V_o$" and "$\phi_o$" instructions to radar signal generating means 16 and return signal processing means 18. Return signal processing means 18 are connected, by an electrical conduit 44, to conventional target reporting subsystem means 46 (shown in phantom lines) which may, for example, include target display means (not shown), such as one or more cathode ray display tubes.

Figure 2A:
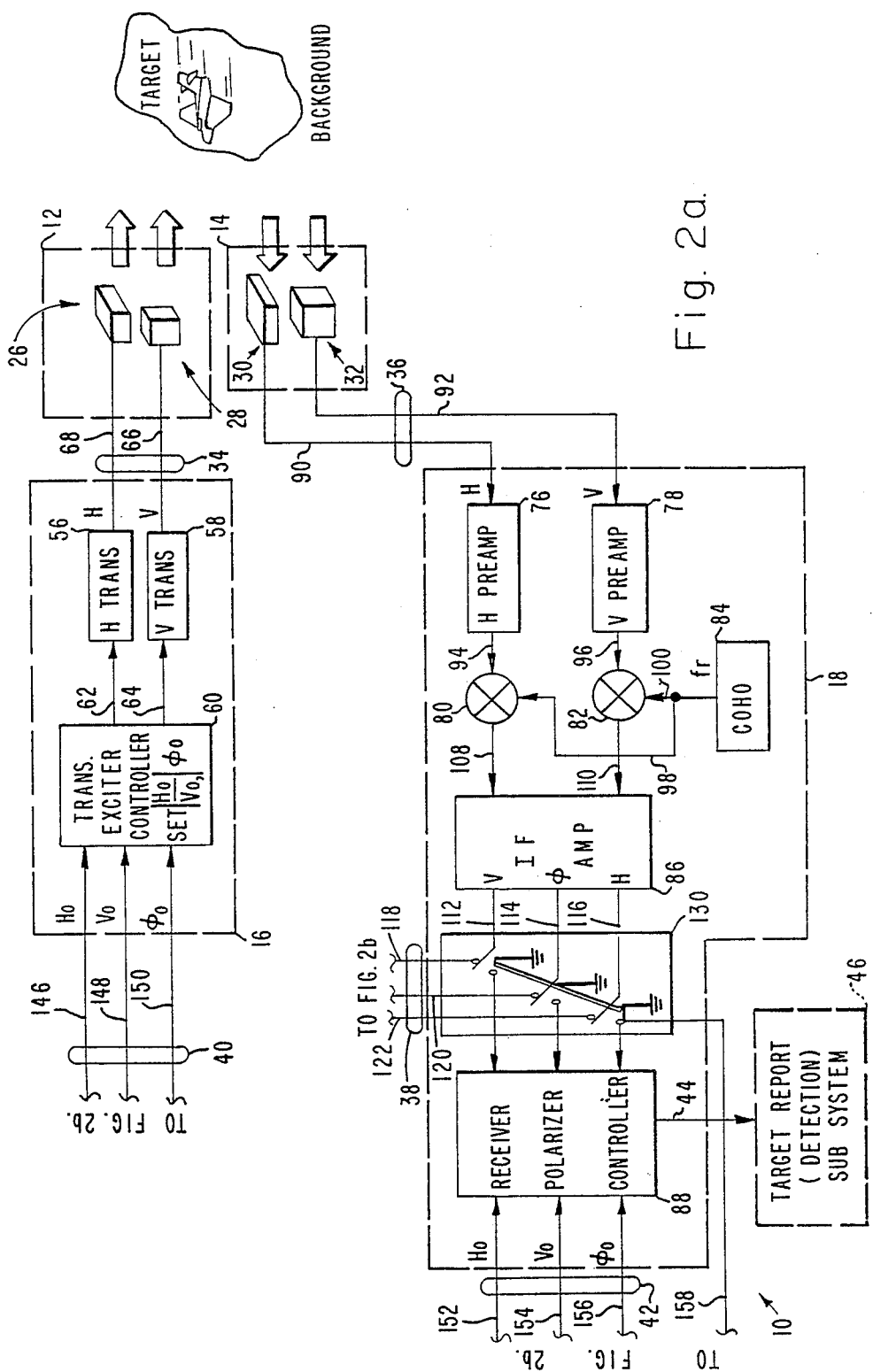

Radar apparatus 10 is more particularly depicted, in block diagram form, in FIG. 2. Shown further comprising radar signal generating means 16 are respective "H" and "V" transmitters 56 and 58 as well as transmitter exciter and controller means 60. Internally, exciter and controller means provide control signals, over conduits 62 and 64, to respective "H" and "V" transmitters 56 and 58. Transmitters 56 and 58, in turn, provide "H" and "V" signals to respective "H" and "V" antenna portions 26 and 28 via conduit 34, such conduit comprising, as shown, separate conduits 66 and 68. Preferably, "H" and "V" transmitters 56 and 58 and transmitter exciter and controller 60 are of known, conventional design, the exciter and controller adjusting the phase between "H" and "V" signals and their respective amplitudes to provide any desired linear, circular or elliptical polarization state of electromagnetic signals transmitted by antenna portions 26 and 28.

Comprising return signal processing means, as shown in FIG. 2, are an "H" preamp 76, a "V" preamp 78, an "H" signal mixer 80, a "V" signal mixer 82, a coherent oscillator (reference oscillator) 84 (having a reference frequency $f_r$), an IF amplifier 86, and a receiver polarization controller 88. Return signals from "H" and "V" receiving antenna portions 30 and 32 are input over respective conduits 90 and 92 (which comprise conduit 36) to "H" and "V" preamplifiers 76 and 78. Amplified "H" and "V" signals are fed from respective "H" and "V" preamplifiers 76 and 78, over conduits 94 and 96, to respective "H" and "V" mixers 80 and 82, which are fed, over conduits 98 and 100, a reference frequency ($f_r$) signal from coherent oscillator 84. From mixers 80 and 82, intermediate frequency (IF) output signals are fed, over respective conduits 108 and 110, to IF amplifier 86. "H", "V" and "$\phi$" data is, in turn, fed from IF amplifier 86, over respective conduits 112, 114 and 116, to receiver polarization controller 88. The "H", "V" and "$\phi$" data from IF amplifier 86 are alternatively provided to null polarization computer and controller 20, over conduits 118, 120 and 122 (which comprise conduit 36), as more particularly described below. Conduits 118, 120 and 122 tap into respective conduits 112, 114 and 116 through a switch 130.

Receiver polarization controller 88 controls the processing therein of "H" and "V" data by establishing the polarization state therof, in actuality , by establishing the phase difference between the "H" and "V" return data and their relative amplitudes, as is known in the art. Typically, the return "H" and "V" data is processed at the same polarization state as the radar signal is transmitted. Processed data is transmitted from receiver polarization controller 88, via conduit 44, to target report subsystem 46. Preferably, "H" and "V" preamplifiers 76 and 78, mixers 80 and 82, coherent oscillator 84, IF amplifier 88 and receiver polarization controller 88 are of known configuration.

Null polarization computing means 20 comprise clutter signal measurement unit 132, polarization null computer (all cells) 134 and mean null computer 136. The functions of null polarization computing means 20 are to cause the generation of a test signal by transmitting antenna means 12 to determine, by the solving of the $|H_o/V_o|$ matrix of the return signal from the transmitted test signal, the null polarization state of the return signal for each range and azimuth cell associated with the radar, and to compute therefrom a suitable mean null polarization for all range cells in each range sweep and from these a mean among all azimuth cells. Provided the test signal is transmitted at a low grazing angle at a uniform background, such as a sea surface, the mean null polarization determined by computing means 20 will be the mean null polarization of the background clutter (for example, of the sea clutter). If necessaary, the mean of each azimuth cell can be retained for processing returns if the variation among azimuth cells is considered to be too large for adequate clutter rejection.

In effect, the mean null polarization determination of the present invention averages the null positions of the clutter on the Poincaré polarization sphere by finding the mean central angle to the center of the sphere.

When the mean null polarization state of the background clutter has been determined, computing and control means 20 control radar signal generating means 16 so that antenna means 12 transmits radar signals at the mean null polarization state and also control return signal processing means 18 to operate at the same mean null polarization state. As a consequence, the return signals from the background (that is, the background clutter) is substantially reduced or is elminated.

It is to be appreciated that all radar transmission are at some polarization state and all return signals are processed at some polarization state, usually the same polarization state as the transmitted signal. In the present instance, null polarization computer and control means 20 make the polarization state selection based upon the determination of the computed mean null polarization of the measured background clutter. No additional computations are required after the operating polarization state of apparatus 10 is determined, and after the polarization state has been determined (by computing and control means 20) radar signal generating means 16, transmitting antenna means 12, receiving antenna means 14 and return signal processing means 18 operate in a generally known, conventional manner.

Because two null polarization states are associated with the objects, including background, null polarization computing and control means can cause radar signal generating means 16 and return signal processing means 18 to alternately operate between both mean null polarization states so that any target which might have a null polarization state near one of the background null polarization state has a better chance of being detected. In this regard, it can be appreciated, however, that at whatever polarization state any radar is operated, there may be targets which have a null polarization at the operating polarization.

"H", "V" and "$\phi$" receive signals are provided from IF amplifier 86, via conduits 118, 120 and 122, to switch 130. From switch 130, "H", "$\phi$" and "V" data is provided to clutter signal measurement unit 132 via conduits 118, 120 and 122 for null polarization computations.

Within clutter signal measurement unit 132, the "H", "$\phi$" and "V" are used to compute the polarization null in terms of the ratio of H and V, designated herein as $H_o/V_o$, and the relative phase, $\phi_o$, between $H_o$ and $V_o$; by solving the matrix equation:

$$(H, V)(\sigma_{ij})(H, V) \tag{1}$$

In Equation (1), the term $\sigma_{ij}$ refers to the sea surface radar cross section for cell combinations, (i, j), of vertical and horizontal transmission and to correponding vertical and horizontal reception. $\sigma_{ii}$ can be written either as $\sigma_{VV}$, $\sigma_{HH}$, $\sigma_{HV}$ and $\sigma_{VH}$ or $\sigma_{11}$, $\sigma_{22}$, $\sigma_{12}$, and $\sigma_{21}$. Also in Equation (1), H and V are unknown quantites having phase and amplitude.

Radar apparatus 10 is first required to compute the radar cross section of each cell of interest, $\sigma_{ij}$, using the well known radar range equation:

$$P_r = \frac{P_t G_t}{4\pi R^2} \times \frac{\sigma}{4\pi R^2} \times A_r \tag{2}$$

as found, for example, in *Radar Handbook* by M. Skolnik, McGraw Hill, 1970, Pages 1–4. In Equation (2) $P_r$ is the power density at a distance R (in meters) from a radar that radiates a power of $P_t$ (in watts) from an antenna having a gain $G_t$. $\sigma$ is the target cross section in meters$^2$ and $A_r$ is the effective aperture area, also in meters$^2$.

The solution to Equation (1), when the elements $\sigma_{ij}$ are known is:

$$\left|\frac{H_o}{V_o}\right| < \phi_o = - \frac{\sigma_{12} \mp \sqrt{\sigma_{12}^2 - \sigma_{11}\sigma_{22}}}{\sigma_{11}} \tag{3}$$

wherein $\angle \phi_o$ indicates a phase angle relationship between $H_o$ and $V_o$ and wherein $\sigma_{12}$ is equal to $\sigma_{21}$ (which accounts for only $\sigma_{12}$ appearing in the right-hand side of the equation).

In order to operate the radar at this null polarization, the system gain in the H and V channels are set at any suitable values such that their ratio is $H_o/V_o$ and have a relative phase angle $\phi$.

The values $|H_o/V_o|$ and $\phi$ for all cells are transmitted from polarization null computer 134, via a conduit 146, to mean null computer 136, wherein a mean horizontal control signal $H_o$ and a mean vertical control signal $V_o$ are computed. The mean values of $H_o$, $V_o$ and $\phi_o$ are then transmitted from computer and control 136 to transmitter exciter controller 60 over respective conduits 146, 148 and 150 (which comprise conduit 40). Similarly, mean $H_o$, $V_o$ and $\phi_o$ values are transmitted from mean null computer and controller 136, via respective conduits 152, 154 and 156 (which comprise conduit 42), to receiver polarization controller 88.

From time to time, as background conditions change, for example, as ocean waves increase or decrease significantly in size or direction, the mean null polarization of the background may be redetermined and the values $H_o$, $V_o$ and $\phi_o$ updated. It is to be understood that these null polarization determinations are made in the absence of targets or other objects which might affect the determinations.

As shown in FIG. 2, mean null computer 136 may be connected, by conduit 158, to switch 130 to control the operation thereof, the switch blocking the transfer of V, H and φ data to clutter signal measuring unit 132 except during test periods in which the background null polarization determinations are made. Further, mean null computer 136 may have provision for displaying the values of $H_o$, $V_o$ and $\phi_o$ associated with the mean null polarization to enable monitoring by the radar operators.

It is evident from the foregoing description of radar 10 that a corresponding method for operating a radar system at a background null polarization state is provided. Such method includes the transmitting of a test signal which may, for example, comprise a horizontally polarized signal followed by a vertically polarized signal (or vice versa); processing the background return signals from the test signals to obtain a null polarization state; determining a mean null polarization over a selected number of cells or zones; controlling the transmission of radar signals so that the polarization state of the transmitted signals is the same as the mean null polarization state of the background and controlling the processing of return signals so that the polarization state of the receiver is also the same as the mean null polarization state of the background. The method may further include the determination of both mean null polarization states of the background and the alternating of the polarization state of the radar transmitter and receiver between the two mean null polarization states.

There has been described above a specific arrangement of an adaptive radar for operating at the null polarization state of the background, particularly at low radar grazing angles at which target returns are especially difficult to distinguish from background clutter, and a corresponding method for operating a radar, for the purpose of illustrating the manner in which the invention may be used to advantage. It is, however, to be understood that the invention is not limited thereto and, accordingly, all variations and modifications which may occur to those skilled in the art are to be considered to be within the scope and spirit of the claims appended hereto.

What is claimed is:

1. A method for substantially reducing in radar the relatively time-invariant background clutter at low grazing angles, said method being used in a radar of the type having means for transmitting radar signals having a selectable polarization, and having means for determining the polarization of received signals, said method comprising the steps of:
    (a) transmitting test radar signals having a selected polarization, said test signal being directed toward a preestablished group of radar range cells and azimuth cells;
    (b) receiving radar return signals generated by said transmitted test signals;
    (c) determining the polarization state of the radar return signals for each of said radar range and azimuth cells;
    (d) calculating, for the radar return signal from each range cell, the position of the polarization state of said radar return signal on the Poincare polarization sphere;
    (e) calculating the means central angle of said radar return signals on said Poincare polarization sphere, said means central angle representing the means null polarization of the background clutter, said means central angle identifying a specific polarization;
    (f) transmitting operational radar signals having said specific polarization state;
    (g) receiving the operational radar return signals generated by said transmitted radar signals having said specific polarization state; and
    (h) processing said operational radar return signals at said specific polarization state.

* * * * *